United States Patent [19]
Barren et al.

[11] Patent Number: 6,133,360
[45] Date of Patent: Oct. 17, 2000

[54] POLYCARBONATE RESIN BLENDS CONTAINING TITANIUM DIOXIDE

[75] Inventors: James P. Barren, Scotia, N.Y.; Fred Fuh-Sheng Chen, Parkersburg, W. Va.; Arthur J. Osborn, Catskill, N.Y.

[73] Assignee: General Electric Company, Pittsfield, Mass.

[21] Appl. No.: 09/177,946

[22] Filed: Oct. 23, 1998

[51] Int. Cl.[7] .............................. C08K 3/22; C08L 51/06; C08L 53/02
[52] U.S. Cl. ..................... 524/431; 524/430; 524/497; 524/504; 524/525; 524/127; 523/200
[58] Field of Search ..................................... 524/430, 497, 524/860, 525, 504, 431; 523/200

[56] References Cited

U.S. PATENT DOCUMENTS

| | | |
|---|---|---|
| 2,482,761 | 9/1949 | Goebel . |
| 2,664,429 | 12/1953 | Goebel . |
| 2,793,219 | 5/1957 | Barrett et al. . |
| 2,793,220 | 5/1957 | Barrett et al. . |
| 2,955,121 | 10/1960 | Myers et al. . |
| 3,076,003 | 1/1963 | Myers et al. . |
| 3,169,121 | 2/1965 | Goldberg . |
| 3,383,092 | 5/1968 | Cazier . |
| 3,507,890 | 4/1970 | Dieckelmann . |
| 3,544,514 | 12/1970 | Schnell et al. . |
| 3,635,895 | 1/1972 | Kramer . |
| 3,671,487 | 6/1972 | Abolins . |
| 3,723,373 | 3/1973 | Lucas . |
| 3,925,342 | 12/1975 | Scharrer . |
| 4,001,184 | 1/1977 | Scott . |
| 4,166,055 | 8/1979 | Lee, Jr. ................................. 260/30.6 |
| 4,213,891 | 7/1980 | Wear .................................. 260/45.75 |
| 4,430,484 | 2/1984 | Quinn . |
| 4,487,896 | 12/1984 | Mark et al. . |
| 4,579,906 | 4/1986 | Zabrocki et al. . |
| 4,786,350 | 11/1988 | Nesbitt et al. ...................... 156/244.24 |
| 5,089,200 | 2/1992 | Chapman, Jr. et al. ................ 264/127 |
| 5,132,368 | 7/1992 | Chapman, Jr. et al. ................ 525/165 |
| 5,204,394 | 4/1993 | Gosens et al. .......................... 524/125 |
| 5,212,272 | 5/1993 | Sargent et al. ...................... 526/317.1 |
| 5,411,999 | 5/1995 | Gallucci . |
| 5,451,632 | 9/1995 | Okumura ................................ 524/537 |
| 5,521,230 | 5/1996 | Bathia et al. ........................... 523/328 |
| 5,539,036 | 7/1996 | Fong et al. ............................. 524/373 |
| 5,629,376 | 5/1997 | Sargent et al. ......................... 524/745 |
| 5,672,645 | 9/1997 | Eckel et al. . |
| 5,679,741 | 10/1997 | Breton et al. . |
| 5,681,875 | 10/1997 | Huang et al. . |
| 5,686,012 | 11/1997 | Hayashi et al. ...................... 252/62.56 |
| 5,780,399 | 7/1998 | Ishikawa et al. ....................... 508/452 |

FOREIGN PATENT DOCUMENTS 0 739 914 A1  10/1996  European Pat. Off. .

OTHER PUBLICATIONS

Kronos Titanium Dioxide in Plastics Issue 1993, Commercial Brochure.
Plastics Compounding Nov./Dec. 1993, pp. 44–46.
Chapter 5 entitled "Hydrogenation of Fatty Acids" in the book "Fatty Acids in Industry" edited by Robert Johnson & Earel Fritz & published by Marcel Dekker, Inc., NY, NY.
Journal of Polymer Science: Part B: Polymer Physics, vol. 31, 1995–2001 (1993) Effect of Oligomers and Acrylonitrile Content on the Interfacial Adhesion Between PC and SAN by V. Janarthanan, Richard S. Stein & Paul D. Garrett.
Eur. Polym. J. vol. 25, No. 9, pp. 985–988, 1989.

*Primary Examiner*—Vasu Jagannathan
*Assistant Examiner*—Katarzyna Wyrozebski

[57] ABSTRACT

Thermoplastic resin compositions containing an aromatic polycarbonate resin and a surface modified titanium dioxide having a first coating and no further coatings are disclosed. The compositions may include a rubber modified graft copolymer comprising a discontinuous rubber phase dispersed in a continuous rigid thermoplastic phase, wherein at least a portion of the rigid thermoplastic phase is chemically grafted to the rubber phase; a rigid copolymer; a fluoropolymer; and/or a flame retarding amount of an organophosphorus flame retardant. Preferred titanium dioxide include first coating materials of polyols or polysiloxanes. The thermoplastic resin compositions exhibit improved resistance to streaking compared to such thermoplastic resin compositions which incorporate titanium dioxide having a first coating and at least one additional coating.

25 Claims, No Drawings

POLYCARBONATE RESIN BLENDS CONTAINING TITANIUM DIOXIDE

FIELD OF THE INVENTION

This invention relates to moldable polycarbonate resin blends which contain titanium dioxide. The invention also relates to injection molding such resin blends and the articles obtained thereby.

BRIEF DESCRIPTION OF THE RELATED ART

Flame retardant thermoplastic resin compositions that contain an aromatic polycarbonate resin, an ABS graft copolymer, a fluoropolymer and an organophosphate flame retardant are known and have been found to exhibit good flame retardancy and good heat resistance, see, for example, coassigned U.S. Pat. No. 5,204,394.

It is also known that it is desirable to incorporate titanium dioxide into various thermoplastic resin blends. Titanium dioxide is incorporated into resin blends as a coloring agent to obtain desirable appearance.

The prior art specifically relating to polycarbonate resins indicate that a preferred titanium dioxide for use in such resins consists of plural coatings, usually two or three coatings which may comprise a firs: polysiloxane or polyol coating, a second silicone type coating, and/or a third branched polyorganosiloxane with silanol functionality. See, for example, Kronos Titanium Dioxide in Plastics Issue 1993, commercial brochure; and *Plastics Compounding,* November/December 1993, pages 44–46. Such prior art indicates that titanium dioxide with such coatings provides polycarbonate resins with good color and physical properties.

Polycarbonate resin blend compositions that incorporate titanium dioxide to impart improved aesthetic appearance, particularly improved resistance to streaking, are desired. We have discovered that the titanium dioxides preferred by the prior art, having plural coatings, result in streaking when molding polycarbonate resin blends.

SUMMARY OF THE INVENTION

We have discovered that by utilizing titanium dioxide with only one coating, thermoplastic polycarbonate resin blends can be molded with less streaking or essentially no streaking.

The polycarbonate resin compositions of the present invention comprise:
  (a) an aromatic polycarbonate resin,
  (b) a rubber modified graft copolymer comprising a discontinuous rubber phase dispersed in a continuous rigid thermoplastic phase, wherein at least a portion of the rigid thermoplastic phase is chemically grafted to the rubber phase,
  (c) a rigid copolymer, and
  (d) titanium dioxide having a first coating and being free from further coatings.

The polycarbonate resin composition of the present invention may also comprise at least one of:
  (e) a fluoropolymer,
  (f) a flame retarding amount of an organophosphate flame retardant, and
  (g) a weatherable acrylic impact modifier component, as well as conventional additives.

The invention also relates to a method for making such a polycarbonate resin composition by blending together the above components (a), (b), (c) and (d) and optionally at least one of (e), (f) and (g).

The method of the invention also relates to molding the polycarbonate resin compositions, including injection molding the compositions.

The invention also relates to the molded articles themselves, which exhibit very low, or essentially no streaking.

DETAILED DESCRIPTION OF THE INVENTION

In a preferred embodiment, the thermoplastic resin composition of the present invention comprises, based on 100 parts by weight ("pbw") of thermoplastic resin composition, from 50 to 90 pbw, more preferably from 70 to 81 pbw, of the aromatic polycarbonate resin, from 4 to 30 pbw, more preferably from 5 to 10 pbw, of the rubber modified graft copolymer, from 2 to 15 pbw, more preferably from 5 to 10 pbw, of the rigid copolymer phase, from 5 to 15 pbw, more preferably from 8 to 12 pbw of the organophosphate flame retardant, from 0.2 to 1 pbw, more preferably from 0.4 to 0.8 pbw of the fluoropolymer masterbatch, and from 0.3 to 10 pbw, more preferably from 0.8 to 2.5 pbw titanium dioxide.

The thermoplastic resin composition may also comprise from 0 to 8 pbw, more preferably from 1.0 to 5 pbw of the weatherable acrylic impact modifier.

(a) Aromatic polycarbonate resin.

Aromatic polycarbonate resins suitable for use as the polycarbonate resin component of the thermoplastic resin composition of the present invention are known compounds whose preparation and properties have been described, see, generally, U.S. Pat. Nos. 3,169,121, 4,487,896 and 5,411,999, the respective disclosures of which are each incorporated herein by reference.

In a preferred embodiment, the aromatic polycarbonate resin component of the present invention is the reaction product of a dihydric phenol according to the structural formula (I):

wherein A is a divalent aromatic radical, with a carbonate precursor and contains structural units according to the formula (II):

wherein A is defined as above.

As used herein, the term "divalent aromatic radical" includes those divalent radicals containing a single aromatic ring such as phenylene, those divalent radicals containing a condensed aromatic ring system such as, for example, naphthlene, those divalent radicals containing two or more aromatic rings joined by a non-aromatic linkage, such as for example, an alkylene, alkylidene or sulfonyl group, any of which may be substituted at one or more sites on the aromatic ring with, for example, a halo group or ($C_1$–$C_6$) alkyl group.

In a preferred embodiment, A is a divalent aromatic radical according is to the formula (III):

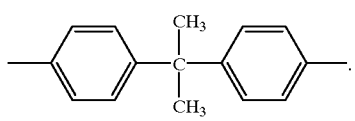

(III)

Suitable dihydric phenols include, for example, one or more of 2,2-bis-(4-hydroxyphenyl) propane ("bisphenol A"), 2,2-bis(3,5-dimethyl-4-hydroxyphenyl)propane, bis(4-hydroxyphenyl) methane, 4,4-bis(4-hydroxyphenyl) heptane, 3,5,3',5'-tetrachloro-4,4'-dihydroxyphenyl) propane, 2,6-dihydroxy naphthalene, hydroquinone, 2,4'-dihydroxyphenyl sulfone. In a highly preferred embodiment, the dihydric phenol is bisphenol A.

The carbonate precursor is one or more of a carbonyl halide, a carbonate ester or a haloformate. Suitable carbonyl halides include, for example, carbonyl bromide and carbonyl chloride. Suitable carbonate esters include, such as for example, diphenyl carbonate, dichlorophenyl carbonate, dinaphthyl carbonate, phenyl tolyl carbonate and ditolyl carbonate. Suitable haloformates include, for example, bishaloformates of a dihydric phenols, such as, for example, hydroquinone, or glycols, such as, for example, ethylene glycol, neopentyl glycol. In a highly preferred embodiment, the carbonate precursor is carbonyl chloride.

Suitable aromatic polycarbonate resins include linear aromatic polycarbonate resins or branched aromatic polycarbonate resins. Suitable linear aromatic polycarbonates resins include, e.g., bisphenol A polycarbonate resin. Suitable branched polycarbonates are known and are made by reacting a polyfunctional aromatic compound with a dihydric phenol and a carbonate precursor to form a branched polymer, see generally, U.S. Pat. Nos. 3,544,514, 3,635,895 and 4,001,184, the respective disclosures of which are incorporated herein by reference. The polyfunctional compounds are generally aromatic and contain at least three functional groups which are carboxyl, carboxylic anhydrides, phenols, haloformates or mixtures thereof, such as, for example, 1,1,1-tri(4-hydroxyphenyl)ethane, 1,3,5,-trihydroxybenzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenone-tetracarboxylic dianhydride. The preferred polyfunctional aromatic compounds are 1,1,1-tri(4-hydroxyphenyl)ethane, trimellitic anhydride or trimellitic acid or their haloformate derivatives.

In a preferred embodiment, the polycarbonate resin component of the present invention is a linear polycarbonate resin derived from bisphenol A and phosgene.

In a preferred embodiment, the weight average molecular weight of the polycarbonate resin is from about 10,000 to about 200,000 grams per mole ("g/mol"), as determined by gel permeation chromatography relative to polystyrene. Such resins typically exhibit an intrinsic viscosity of about 0.3 to about 1.5 deciliters per gram in methylene chloride at 25° C.

Polycarbonate resins are made by known methods, such as, for example, interfacial polymerization, transesterification, solution polymerization or melt polymerization.

Copolyester-carbonate resins are also suitable for use as the aromatic polycarbonate resin component of the present invention. Copolyester-carbonate resins suitable for use as the aromatic polycarbonate resin component of the thermoplastic resin composition of the present invention are known compounds whose preparation and properties have been described, see, generally, U.S. Pat. Nos. 3,169,121, 4,430,484 and 4,487,896, the respective disclosures of which are each incorporated herein by reference.

Copolyester-carbonate resins comprise linear or randomly branched polymers that contain recurring carbonate groups, carboxylate groups and aromatic carbocyclic groups in the polymer chain, in which at least some of the carbonate groups are bonded directly to the ring carbon atoms of the aromatic carbocyclic groups.

In a preferred embodiment, the copolyester-carbonate resin component of the present invention is derived from a carbonate precursor, at least one dihydric phenol and at least one dicarboxylic acid or dicarboxylic acid equivalent. In a preferred embodiment, the dicarboxylic acid is one according to the formula (IV):

(IV)

wherein A' is alkylene, alkylidene, cycloaliphatic or aromatic and is preferably a non-substituted phenylene radical or a substituted phenylene radical that is substituted at one or more sites on the aromatic ring, wherein each of such substituent groups is independently $(C_1-C_6)$alkyl, and the copolyester carbonate resin comprises first structural units according to formula (II) above and second structural units according to formula (V):

(V)

wherein A' is defined as above.

Suitable carbonate precursors and dihydric phenols are those disclosed above.

Suitable dicarboxylic acids, include, for example, phthalic acid, isophthalic acid, terephthalic acid, dimethyl terephthalic acid, oxalic acid, malonic acid, succinic acid, glutaric acid, adipic acid, pimelic acid, suberic acid, azelaic acid, sebacic acid, dimethyl malonic acid, 1,12-dodecanoic acid, cis-1,4-cyclohexane dicarboxylic acid, trans-1,4-cyclohexane dicarboxylic acid, 4,4'-bisbenzoic acid, naphthalene-2,6-dicarboxylic acid. Suitable dicarboxylic acid equivalents include, for example, anhydride, ester or halide derivatives of the above-disclosed dicarboxylic acids, such as, for Example, phthalic anhydride, dimethyl terephthalate, succinyl chloride.

In a preferred embodiment, the dicarboxylic acid is an aromatic dicarboxylic acid, more preferably one or more of terephthalic acid and isophthalic acid.

In a preferred embodiment, the ratio of ester bonds to carbonate bonds present in the copolyester carbonate resin is from 0.25 to 0.9 ester bonds per carbonate bond.

In a preferred embodiment, the copolyester-carbonate copolymer has a weight average molecular weight of from about 10,000 to about 200,000 g/mol.

Copolyester-carbonate resins are made by known methods, such as, for example, interfacial polymerization, transesterification, solution polymerization or melt polymerization.

(b) Rubber modified graft copolymer.

Rubber modified thermoplastic resins suitable for use as the rubber modified thermoplastic resin of the present invention are those rubber modified thermoplastic resins that are made by an emulsion polymerization process and that comprise a discontinuous rubber phase dispersed in a continuous rigid thermoplastic phase, wherein at least about 40% of the rigid thermoplastic phase is chemically grafted to the rubber phase.

Suitable rubbers for use in making the rubber phase are polymers those having a glass transition temperature ($T_g$) of less than or equal to 25EC, more preferably less than or equal to 0 EC, and even more preferably less than or equal to −30EC. As referred to herein, the $T_g$ of a polymer is the $T_g$ value of polymer as measured by differential scanning calorimetry (heating rate 20EC/minute, with the $T_g$ value being determined at the inflection point).

In a preferred embodiment, the rubber comprises a linear polymer having structural units derived from one or more conjugated diene monomers.

Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4, hexadiene, dichlorobutadiene, bromobutadiene and dibromobutadiene as well as mixtures of conjugated diene monomers. In a preferred embodiment, the conjugated diene monomer is 1,3-butadiene.

The rubber may, optionally, include structural units derived from one or more copolymerizable monoethylenically unsaturated monomers selected from ($C_2$–$C_8$)olefin monomers, vinyl aromatic monomers, monoethylenically unsaturated nitrile monomers and ($C_1$–$C_{12}$)alkyl (meth) acrylate monomers.

As used herein, the term "($C_2$–$C_8$)olefin monomers" means a compound having from 2 to 8 carbon atoms per molecule and having a single site of ethylenic unsaturation per molecule. Suitable ($C_2$–$C_8$)olefin monomers include, e.g., ethylene, propene, 1-butene, 1-pentene, heptene.

Suitable vinyl aromatic monomers include, e.g., styrene and substituted styrenes having one or more alkyl, alkoxyl, hydroxyl or halo substituent group attached to the aromatic ring, including, e.g., "-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers.

As used herein, the term "monoethylenically unsaturated nitrile monomer" means an acyclic compound that includes a single nitrite group and a single site of ethylenic unsaturation per molecule and includes, e.g., acrylonitrile, methacrylonitrile, "-chloro acrylonitrile.

As used herein, the term "($C_1$–$C_{12}$)alkyl" means a straight or branched alkyl substituent group having from 1 to 12 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl and dodecyl, and the terminology "(meth)acrylate monomers" refers collectively to acrylate monomers and methacrylate monomers. Suitable ($C_1$–$C_{12}$)alkyl (meth)acrylate monomers include ($C_1$–$C_{12}$)alkyl acrylate monomers, e.g., ethyl acrylate, butyl acrylate, iso-pentyl acrylate, n-hexyl acrylate, 2-ethyl hexyl acrylate, and their ($C_1$–$C_{12}$)alkyl methacrylate analogs such as, e.g., methyl methacrylate, ethyl methacrylate, propyl methacrylate, iso-propyl methacrylate, butyl methacrylate, hexyl methacrylate, decyl methacrylate.

In a first preferred embodiment, the rubber is a polybutadiene homopolymer.

The elastomeric phase is made by aqueous emulsion polymerization in the presence of a free radical initiator, a polyacid surfactant and, optionally, a chain transfer agent elastomeric phase is grafted with one or more monovinylidene monomers having a Tg greater than about 90 C and coagulated to form particles of elastomeric phase material.

Suitable initiators include conventional free radical initiator such as, e.g., an organic peroxide compound, such as e.g., benzoyl peroxide, a persulfate compound, such as, e.g., potassium persulfate, an azonitrile compound such as, e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate.

Suitable chain transfer agents include, for example, a ($C_9$–$C_{13}$)alkyl mercaptan compound such as nonyl mercaptan, t-dodecyl mercaptan.

Suitable polyacid surfactants include soaps of a polycarboxylic acid that contains from 30 to 108 carbon, more preferably from 32 to 60 carbon atoms, per molecule.

Suitable polycarboxylic acids may be formed by dimerizing a monobasic fatty acid containing ethylenic linkages and from about 14 to about 22 carbon atoms in length. Suitable monobasic fatty acids include, for example, oleic, elaidic, palmitoleic, linoleic, linolenic, licanic, arachidonic, erucic, clupanodonic and elaeostearic acids. In commercial practice naturally occurring mixtures of these acids are generally employed for production of dimerized fatty acids. Such acids may be derived from sources such as tall oil fatty acids, tallow (animal grease) fatty acids and vegetable oils, e.g. soya, linseed, cottonseed, and other oils comprised of unsaturated fatty acid glycerides. In general, the dimerization is carried out by heating the monomeric acid at an elevated temperature, with or without a catalyst, while avoiding cracking and decarboxylation. U.S. Pat. Nos. 2,482,761, 2,664,429, 2,793,219, 2,793,220, 2,955,121, 3,076,003, 3,507,890 and 3,925,342 describe dimerization in further detail.

For improved color, the dimerized fatty adds may be partially or fully saturated by hydrogenation in a subsequent reaction step as described in Chapter 5 entitled "Hydrogenation of Fatty Acids" in the book "Fatty Acids in Industry" edited by Robert Johnson and Earle Fritz and published by Marcel Dekker, Inc. New York, N.Y. Suitable dimer acids are liquid at 25EC even though their number average molecular weight is typically above 500 g/mol.

In a preferred embodiment, the polyacid surfactant comprises greater than or equal to 50 wt % of one or more fatty acid dimers and trimers. The dimerized fatty acids employed to prepare the novel compositions of this invention preferably comprise a product having not more than about 70% tribasic acid and for very low non juicing characteristics not more than 10% monobasic acids. And preferably not more than 5% by weight monobasic acid based on the total weight of the polyacid component. The dimerized acid content is preferably at least 75% by weight based on the total weight of the surfactant.

Preferred polyacids are acyclic aliphatic polyacids, cyclic aliphatic polyacids and cyclic aromatic polyacids. The polyacid is preferably a high molecular weight polyacid having from 30 to 108 carbon atoms and preferred 32 to 60 carbon atoms. Preferably the polyacid is soluble and/or miscible in the thermoplastic compositions.

Preferably the polyacid in the form of carboxylate salts of the polyacid function are surfactants, emulsifiers or soaps.

Various types of dimerized fatty acids are commercially available and such products typically contain trimerized fatty acids, which are tribasic acids formed as a by-product through the polymerization of three molecules of the monobasic fatty acids. Higher polybasic acids such as tetracarboxylic ($C_{72}$) acid and hexacarboxylic ($C_{108}$) acids may also be present. In addition, the commercial products may contain small percentages of isomerized monobasic acids or unreacted or fully saturated monomeric monobasic fatty acids which did not polymerize or which were not removed after the polymerization was carried out. Although dimer acid surfactants are preferred, other emulsifiers or surfactants may be used.

In a preferred embodiment, the polyacid is used in the emulsion polymerization of the rubber phase of the rubber modified graft copolymer of the present invention in an amount of from 0.25 to 5 wt %, more preferably from 0.75 to 3.5 wt % thereof, more preferably from 1.5 to 2.75 wt %, based on 100 parts by weight of butadiene monomer.

In a preferred embodiment, the rubber is polymerized in the presence of an amount of a chain transfer agent that is effective to provide a rubber having a swell index in toluene of greater than 15, more preferably from 20 to 150 and even more preferably from about 40 to 100. The swell index is measured by immersing about 0.2 grams of a cast film of sample composition in about 96 milliliters of toluene for 16 hours at room temperature. The swell index is calculated by dividing the weight of the swollen sample by the weight of the dry sample.

In a preferred embodiment, the emulsion polymerized particles of elastomeric phase material have a weight average particle size of 50 to 180 nanometers ("nm"), more preferably, of from 70 to 150 nm, as measured by light transmission. The size of emulsion polymerized elastomeric particles may optionally be increased by mechanical, colloidal or chemical agglomeration of the emulsion polymerized rubber particles, according to known techniques. Desirable weight average particle size range from 70 to 800 nm, more preferably a bimodal particle distribution averaging about 300 nm.

The rigid thermoplastic resin phase comprises one or more thermoplastic polymers and exhibits a $T_g$ of greater than 25EC, preferably greater than or equal to 90EC and even more preferably greater than or equal to 100EC.

In a preferred embodiment, the rigid thermoplastic phase comprises one or more polymers each having structural units derived from one or more monomers selected from the group consisting of ($C_1$–$C_{12}$)alkyl (meth)acrylate monomers, vinyl aromatic monomers and monoethylenically unsaturated nitrile monomers.

Suitable vinyl aromatic monomers and monoethylenically unsaturated nitrile monomers and of ($C_1$–$C_{12}$)alkyl (meth) acrylate monomers are those set forth above in the description of the rubber phase.

In a preferred embodiment, the rigid thermoplastic resin phase comprises a vinyl aromatic polymer having first structural units derived from one or more vinyl aromatic monomers, preferably styrene, and having second structural units derived from one or more monoethylenically unsaturated nitrile monomers, preferably acrylonitrile. More preferably, the rigid phase comprises from 55 to 99 wt %, still more preferably 60 to 90 wt %, structural units derived from styrene and from 1 to 45 wt %, still more preferably 10 to 40 wt %, structural units derived from acrylonitrile.

The amount of grafting that takes place between the rigid thermoplastic phase and the rubber phase varies with the relative amount and composition of the rubber phase. In a preferred embodiment, from 25 to 55 wt %, preferably from 45 to 55 wt %, of the rigid thermoplastic phase is chemically grafted to the rubber phase and from 45 to 75 wt %, preferably from 40 to 55 wt % of the rigid thermoplastic phase remains "free", i.e., non-grafted.

In a preferred embodiment, one or more separately polymerized rigid thermoplastic polymers to a rigid thermoplastic polymer that has been polymerized in the presence of the rubber phase in order to aid in adjusting the viscosity of the composition of the present invention into the desired range. In a more highly preferred embodiment, the weight average molecular weight of the one or more separately polymerized rigid thermoplastic polymers is from about 50,000 to about 250,000 g/mol.

In a preferred embodiment, the rubber modified thermoplastic resin comprises an rubber phase comprising a polymer having structural units derived from one or more conjugated diene monomers, and, optionally, further comprising structural units derived from one or more monomers selected from vinyl aromatic monomers and monoethylenically unsaturated nitrile monomers, and the rigid thermoplastic phase comprises a polymer having structural units derived from one or more monomers selected from vinyl aromatic monomers and monoethylenically unsaturated nitrile monomers.

In a highly preferred embodiment, the rubber phase of the rubber modified graft copolymer comprises a polybutadiene or poly(styrene-butadiene) rubber and the grafted rigid phase comprises a styrene-acrylonitrile copolymer.

Each of the polymers of the rubber phase and of the rigid thermoplastic resin phase of the rubber modified thermoplastic resin may, provided that the $T_g$ limitation for the respective phase is satisfied, optionally include structural units derived from one or more other copolymerizable monoethylenically unsaturated monomers such as, e.g., monoethylenically unsaturated carboxylic acids such as, e.g., acrylic acid, methacrylic acid, itaconic acid, hydroxy ($C_1$–$C_{12}$)alkyl (meth)acrylate monomers such as, e.g., hydroxyethyl methacrylate; ($C_4$–$C_{12}$)cycloalkyl (meth) acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "($C_4$–$C_{12}$)cycloalkyl" means a cyclic alkyl substituent group having from 4 to 12 carbon atoms per group and the term "(meth)acrylamide" refers collectively to acrylamides and methacrylamides.

(c) Rigid copolymer.

The rigid copolymer may be formed from at least two ethylenically unsaturated monomers and is compatible with the graft copolymer.

Suitable ethylenically unsaturated monomers such as vinyl aromatics, substituted vinyl aromatics, acrylonitrile, substituted acrylonitriles, acrylates, methacrylates, alkylacrylates, alkylmethylacrylates, and ethylenically unsaturated carboxylic acids, diacids, dianhydrides, acid esters, diacid esters, amides, imides and N-substituted imides. Preferably, the rigid polymer is formed from at least two monomers selected from the group consisting of styrene, alpha-methylstyrene, dibromostyrene, methylmethacrylate, acrylonitrile, maleic anhydride, maleimide, N-phenylmaleimide and acrylamide. More preferably, the rigid copolymer is formed from a first monomer selected from styrene, alpha-methylstyrene, dibromostyrene and methyl methacrylate, and at least one other monomer selected from acrylonitrile, methacrylonitrile, methyl methacrylate, maleic anhydride, maleimide, N-phenylmaleimide and acrylamide. In such cases, it is preferred that the rigid copolymer is formed from about 60 to about 95 weight percent of the first monomer and from about 5 to about 40 weight percent of the second monomer.

A preferred rigid copolymer comprises styrene and acrylonitrile. The rigid copolymer may be prepared by any method known in the art including emulsion, bulk, and suspension polymerization processes and combinations thereof.

Examples of preferred rigid copolymers include the following: styrene-acrylonitrile; styrene-acrylonitrile-maleic anhydride; styrene-alpha-methylstyrene-acrylonitrile; styrene-alpha-methylstyrene-acrylonitrile-N-phenylmaleimide; styrene-methyl methacrylate-acrylonitrile; styrene-methyl methacrylate-acrylonitrile-maleic anhydride; styrene-methyl methacrylate-alpha-methylstyrene-acrylonitrile-N-phenyl maleimide; styrene-methyl methacrylate-acrylonitrile-N-phenyl maleimide; styrene-methyl methacrylate-acrylonitrile-N-phenyl maleimide-maleic anhydride; styrene-dibromostyrene-acrylonitrile; styrene-dibromostyrene-acrylonitrile-maleic anhydride; styrene-dibromostyrene-alpha-methylstyrene-acrylonitrile; and styrene-dibromostyrene-acrylonitrile-N-phenyl maleimide.

In a preferred embodiment, the rigid copolymer comprises a vinyl aromatic polymer having first structural units derived from one or more vinyl aromatic monomers, preferably styrene, and having second structural units derived from one or more monethylenically unsaturated nitrile monomers, preferably acrylonitrile. More preferably, the rigid copolymer comprises from about 55 to 99 wt %, still more preferably 60 to 90 wt %, structural units derived from styrene and from 1 to 45 wt %, still more preferably 10 to 40 wt %, structural units derived from acrylonitrile. Such preferred rigid copolymers preferably have a weight average molecular weight of from about 50,000 to 150,000 g/mol.

(d) Fluoropolymer masterbatch.

The composition of the present invention may include a fluoropolymer. Typically the fluoropolymer is provided in an amount from 0.01 to 1.0. pbw fluoropolymer per 100 pbw of the thermoplastic resin composition, that is effective to provide anti-drip properties to the resin composition. Suitable fluoropolymers and methods for making such fluoropolymers are known, see, e.g., U.S. Pat. Nos. 3,671,487, 3,723,373 and 3,383,092. Suitable fluoropolymers include homopolymers and copolymers that comprise structural units derived from one or more fluorinated "-olefin monomers. The term "fluorinated "-olefin monomer" means an "-olefin monomer that includes at least one fluorine atom substituent. Suitable fluorinated "-olefin monomers include, e.g., fluoroethylenes such as, e.g., $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$ and fluoropropylenes such as, e.g., $CF_3CF=CF_2$, $CF_3CF=CHF$, $CF_3CH=CF_2$, $CF_3CH=CH_2$, $CF_3CF=CHF$, $CHF_2CH=CHF$ and $CF_3CH=CH_2$. In a preferred embodiment, the fluorinated "-olefin monomer is one or more of tetrafluoroethylene ($CF_2=CF_2$), chlorotrichloroethylene ($CClF=CF_2$), vinylidene fluoride ($CH_2=CF_2$) and hexafluoropropylene ($CF_2=CFCF_3$).

Suitable fluorinated "-olefin homopolymers include e.g., poly(tetrafluoroethylene), poly(hexafluoroethylene).

Suitable fluorinated "-olefin copolymers include copolymers comprising structural units derived from two or more fluorinated "-olefin copolymers such as, e.g., poly (tetrafluoroethylene-hexafluoroethylene), and copolymers comprising structural units derived from one or more fluorinated monomers and one or more non-fluorinated monoethylenically unsaturated monomers that are copolymerizable with the fluorinated monomers such as, e.g., poly (tetrafluoroethylene-ethylene-propylene) copolymers.

Suitable non-fluorinated monoethylenically unsaturated monomers include e.g., "-olefin monomers such as, e.g., ethylene, propylene butene, acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, vinyl versatate.

In a preferred embodiment, the fluoropolymer particles range in size from 50 to 500 nm, as measured by electron microscopy.

In a highly preferred embodiment, the fluoropolymer is a poly(tetrafluoroethylene) homopolymer ("PTFE").

Since direct incorporation of a fluoropolymer into a thermoplastic resin composition tends to be difficult, it is preferred that a fluoropolymer latex be pre-blended in some manner with a second polymer, such as, an aromatic polycarbonate resin or a styrene-acrylonitrile resin. For example, an aqueous dispersion of fluoropolymer and a polycarbonate resin may be steam precipitated to form a fluoropolymer concentrate for use as a drip inhibitor additive in thermoplastic resin compositions, as disclosed in, for example, U.S. Pat. No. 5,521,230, or, alternatively, an aqueous styrene-acrylonitrile resin emulsion or an aqueous acrylonitrile-butadiene-styrene resin emulsion and then precipitating and drying the co-coagulated fluoropolymer-thermoplastic resin latex composition to provide a PTFE-thermoplastic resin powder as disclosed in, for example, U.S. Pat. No. 4,579, 906. Other suitable methods of forming a fluoropolymer masterbatch are disclosed in, for example, U.S. Pat. Nos. 5,539,036; 5,679,741; and 5,681,875.

In a preferred embodiment, the fluoropolymer masterbatch comprises from 30 to 70 wt % PTFE, more preferably 40 to 60 wt % PTFE, and from 30 to 70 wt %, more preferably 40 to 60 wt %, of the second polymer, as referenced above in this section.

In a preferred embodiment, a fluoropolymer additive is made by emulsion polymerization of one or more monoethylenically unsaturated monomers in the presence of the aqueous fluoropolymer dispersion of the present invention to form a second polymer in the presence of the fluoropolymer. Suitable monoethylenically unsaturated monomers are disclosed above. The emulsion is then precipitated, e.g., by addition of sulfuric acid. The precipitate is dewatered, e.g., by centrifugation, and then dried to form a fluoropolymer additive that comprises fluoropolymer and an associated second polymer. The dry emulsion polymerized fluoropolymer additive is in the form of a free-flowing powder.

In a preferred embodiment, the monoethylenically unsaturated monomers that are emulsion polymerized to form the second polymer comprise one or more monomers selected from vinyl aromatic monomers, monoethylenically unsaturated nitrile monomer and ($C_1$–$C_{12}$)alkyl (meth)acrylate monomers. Suitable vinyl aromatic monomers, monoethylenically unsaturated nitrile monomer and ($C_1$–$C_{12}$)alkyl (meth)acrylate monomers are disclosed above.

In a highly preferred embodiment, the second polymer comprises structural units derived from styrene and acrylonitrile. More preferably, the second polymer comprises from 60 to 90 wt % structural units derived from styrene and from 10 to 40 wt % structural units derived from acrylonitrile.

Suitable fluoropolymer additives and emulsion polymerization methods are disclosed in EP 0 739 914 A1.

In a preferred embodiment, the second polymer referenced above exhibits a weight average molecular weight of from about 10,000 to about 200,000 g/mol.

(e) Organophosphate flame retardant.

Organophosphorus compounds suitable as the organophosphorus flame retardant of the present invention are known compounds including monophosphate esters such as, for example, triphenyl phosphate, tricresyl phosphate, tritolyl phosphate; diphenyl tricresylphosphate, phenyl bis-dodecyl phosphate, ethyl diphenyl phosphate, as well as diphosphate esters and oligomeric diphosphates such as, for example, resorcinol diphosphate, bisphenol-A diphosphate, diphenyl hydrogen phosphate, 2-ethylhexyl hydrogen phosphate. Suitable oligomeric diphosphate compounds are set forth in coassigned U.S. Pat. No. 5,672,645, to Johannes C. Gossens et al for a "Polymer Mixture Having Aromatic Polycarbonate, Styrene Containing Copolymer and/or Graft Copolymer and a Flame Retardant, Articles Formed Therefrom", the disclosure of which is hereby incorporated herein by reference.

In a preferred embodiment, the organophosphorus flame retardant of the present invention comprises one or more compounds according to the structural formula (VI):

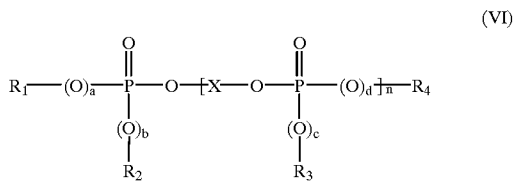

(VI)

wherein $R_1$, $R_2$, $R_3$ and $R_4$ are each independently aryl, which may be optionally substituted with halo or alkyl, X is arylene, optionally substituted with halo or alkyl, a, b, c and d are each independently 0 or 1, and n is an integer of from 0 to 5, more preferably from 1 to 5.

As used herein, aryl means a monovalent radical containing one or more aromatic rings per radical, which, in the case wherein the radical contains two or more rings, may be fused rings and which may optionally be substituted on the one or more aromatic rings with one or more alkyl groups, each preferably ($C_1$–$C_6$)alkyl.

As used herein, arylene means a divalent radical containing one or more aromatic rings per radical, which may optionally be substituted on the one or more aromatic rings with one or more alkyl groups, each preferably ($C_1$–$C_6$)alkyl and which, in the case wherein the divalent radical contains two or more rings, the rings may be may be fused or may be joined by a non-aromatic linkages, such as for example, an alkylene, alkylidene, any of which may be substituted at one or more sites on the aromatic ring with a halo group or ($C_1$–$C_6$)alkyl group.

In a highly preferred embodiment, $R_1$, $R_2$, $R_3$ and $R_4$ are each phenyl, a, b, c and d are each 1 and X is phenylene, more preferably 1,3-phenylene.

In an alternative highly preferred embodiment, embodiment, $R_1$, $R_2$, $R_3$ and $R_4$ are each phenyl, a, b, c and d are each 1 and X is a divalent radical according to the structural formula (VII):

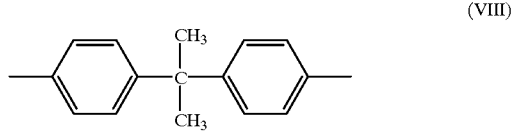

(VIII)

In a preferred embodiment, the organophosphorus flame retardant comprises a blend of organophosphorus oligomers, each according to formula (VI), wherein n is, independently for each oligomer, an integer from 1 to 5 and wherein the blend of oligomers has an average n of from greater than 1 to less than 5, more preferably greater than 1 to less than 3, even more preferably greater than 1 to less than 2, still more preferably from 1.2 to 1.7.

(f) Titanium dioxide.

Inorganic treatments which are present in a variety of titanium dioxide's are hydrated alumina, silicon dioxide, sodium silicates, sodium aluminates, sodium aluminum silicates, zinc oxide, zirconium oxide, and mica. These are used as building blocks in the construction of the titanium dioxide particle. They may be selectively precipitated such that they occur close to the surface in the individual particles. These treatments are typically used as dispersing aids and neutralizing agents.

Furthermore, the raw or treated titanium dioxide particles can be coated with organic surface coatings such as a silicone oil, alkyl silane compounds, alkyl hydrogen polysiloxanes, polyorganosiloxanes, alcohols, or polyols, alkyl phosphates or phosphorylated fatty acids. Additionally, specialized coatings such as titanate coupling agents (e.g., isopropyl triisostearoyl titanate) may be incorporated.

The thermoplastic resin composition of the invention contains a surface-modified titanium dioxide having a first coating and being free from additional coatings. A suitable first coating material is, for example, a polyol. One preferred polyol is trimethylol propane. Another suitable first coating material is, for example, a polysiloxane. One preferred polysiloxane is polydimethylsiloxane. The titanium dioxide is free from additional coatings, such as additional silicone and silanol coatings.

(g) Weatherable acrylic impact modifiers.

In a preferred embodiment the thermoplastic resin composition includes a weatherable acrylic impact modifier. Suitable weatherable acrylic impact modifiers include, for example, polyorganosiloxane, polybutalacrylate, poly 2-ethylhexylacrylate, and mixtures thereof, grafted to a poly(methyl methacrylate) homopolymer or acrylate copolymer or styrene and acrylonitrile. The weatherable acrylic impact modifier preferably comprises from about 50 to 80 wt % rubber component and from about 20 to 50 wt % grafted phase.

Additives.

The thermoplastic resin composition of the present invention may optionally also contain various conventional additives, such as antioxidants, such as, e.g., organophosphites, e.g., tris(nonyl-phenyl)phosphite, (2,4,6-tri-tert-butylphenyl)(2-butyl-2-ethyl-1,3-propanediol) phosphite, bis(2,4-di-t-butylphenyl)pentaerythritol diphosphite or distearyl pentaerythritol diphosphite, as well as alkylated monophenols, polyphenols, alkylated reaction products of polyphenols with dienes, such as, e.g., butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4-hydroxyphenol)-propionic acid with monohydric or polyhydric alcohols, esters of beta-(5-tert-butyl-4-hydroxy-3-methylphenyl)-propionic acid with monohydric or polyhydric alcohols, esters of beta-(5-tert-butyl-4-hydroxy-3-methylphenyl) propionic acid with mono-or polyhydric alcohols, esters of thioalkyl or thioaryl compounds, such as, e.g., distearylthiopropionate, dilaurylthiopropionate, ditridecylthiodipropionate, amides of beta-(3,5-di-tert-butyl-4-hydroxyphenol)-propionic acid; UV absorbers and light stabilizers such as, e.g., (i) 2-(2'-hydroxyphenyl)-benzotriazoles, 2-hydroxybenzophenones; (ii) esters of substituted and unsubstituted benzoic acids, (iii) acrylates, hydrotalcite; impact modifiers; fillers and reinforcing agents, such as, e.g., silicates, glass fibers, carbon black, graphite, calcium carbonate, talc, mica; and other additives such as, e.g., lubricants such as, e.g., pentaerythritol tetrastearate, ethylene oxide propylene oxide oligomeric surfactants, silicone fluids, plasticizers, optical brighteners, pigments, dyes, colorants, flameproofing agents; anti-static agents; and blowing agents, as well as other flame retardants in addition to the above-disclosed organophosphorus flame retardant and fluoropolymer.

The thermoplastic resin composition of the present invention is made by combining and mixing the components of the composition of the present invention under conditions suitable for the formation of a blend of the components, such as for example, by melt mixing using, for example, a two-roll mill, a Banbury mixer or a single screw or twin-screw extruder, and, optionally, then reducing the composition so formed to particulate form, e.g., by pelletizing or grinding the composition.

The thermoplastic resin composition of the present invention can be molded into useful shaped articles by a variety of means such as injection molding, extrusion, rotational molding, blow molding and thermoforming to form articles such as, for example, computer and business machine housings, home appliances.

EXAMPLES

Examples 1–5 and Comparative Examples C1–C5

The respective thermoplastic resin compositions of the examples of the present invention were each made by combining the components described below in the relative amounts (each expressed in parts by weight). The components used in the thermoplastic resin compositions were as follows:

| | |
|---|---|
| PC-1 | Linear polycarbonate resin having an absolute weight average molecular weight of about 30,000 g/mol; |
| PC-2 | Linear polycarbonate resin having an absolute weight average molecular weight of about 22,000 g/mol; |
| PC-3 | Linear polycarbonate resin having an absolute weight average molecular weight of about 27,500 g/mol; |
| SAN-1 | Copolymer of 75 wt % styrene and 25 wt % acrylonitrile having a relative weight average molecular weight of about 60,000 g/mol; |
| SAN-2 | Copolymer of 75 wt % styrene and 25 wt % acrylonitrile having a relative weight average molecular weight of about 77,000 g/mol; |
| SAN-3 | Copolymer of 75 wt % styrene and 25 wt % acrylonitrile having a relative weight average molecular weight of about 95,000 g/mol; |
| ABS HRG | A high rubber graft copolymer prepared by grafting a styrene-acrylonitrile copolymer onto a butadiene rubber in a 50/50 weight ratio; |
| FR | Organophosphate flame retardant; |
| WA-IM | Weatherable acrylic impact modifier; |
| PTFE-MB | Additive made by copolymerizing styrene and acrylonitrile in the presence of an aqueous dispersion of PTFE (50 pbw PTFE, 50 pbw of a styrene-acrylonitrile copolymer containing 75 wt % styrene and 25 wt % acrylonitrile); |
| LUB. | Lubricant; |
| TiO$_2$-1 | Titanium dioxide particles purchased from SCM under the tradename RCL69 and comprising about 97 wt % titanium dioxide and 1.5 wt % alumina. Particles are coated with a first coating of about 0.33 wt % polydimethylsiloxane and a second coating of about 1.0 wt % of a silicone hydride fluid and a third coating of about 1.1 wt % of a branched silanol fluid, all weights based on the total weight of particle; |
| TiO$_2$-2 | Titanium dioxide particles purchased from DuPont Co. under the tradename R103. Particles comprise about 96 wt % titanium dioxide and about 3.2 wt % alumina. Particles are coated with a first coating of about 0.25 wt % (based on particle weight) polyol coating with no further surface coating; and |
| Pigments | organic and inorganic coloring components. |

The blends were prepared by blending the components in a Henshel mixer for about one minute, and then the blend was added into the hopper of an extruder. In a typical small scale lab experiment, six barrel Welding Engineers 30 mm extruder was used to compound these blends at 320–400 rpm with melt temperature of approximately 550° F. The compounded materials were injection molded at about 525° F. to form sample plaques.

All of the thermoplastic resin compositions were then ranked for streaking on the basis of visual examination. The appearance of the injection molded plaques were evaluated by 3 to 5 operators rating 5 sample plaques of each composition on a scale of 0 to 5, with lower numbers indicating less streaking and higher numbers indicating comparatively more streaking. The ratings for all samples of each composition were summed and the sums were each normalized by dividing each sum by number of samples evaluated (number of samples=5×(number of operators)) to obtain the average streaking values reported for each of the compositions in Table I below. The various components of each resin composition is provided in weight percent, based on the total weight of the resin composition.

Additionally, Examples 1–3 and C1–C3 were compared by taking spectrophotometric measurements. Numeric measurements of dL shifts were made with a fiber optic probe spectrophotometer. The L* value of the streak was measured and compared to the base color of the plaque right next to the streak being measured. The difference, dL, equals L at the streak minus L at the base color. Several samples were taken from each example and averaged to arrive at the dL shift values set forth in Table I below.

The examples clearly show that the thermoplastic resins containing titanium dioxide with a first coating, and with no further coating, result in reduced streaking when molded compared to the thermoplastic resins containing titanium dioxide with a first coating and at least one additional coating comprising silicone.

TABLE I

| | C1 | C2 | C3 | C4 | C5 | 1 | 2 | 3 | 4 | 5 |
|---|---|---|---|---|---|---|---|---|---|---|
| PC-1 | 44.03 | 44.03 | 44.03 | — | — | 44.03 | 44.03 | 44.03 | — | — |
| PC-2 | 29.36 | 29.36 | 29.36 | — | — | 29.36 | 29.36 | 29.36 | — | — |
| PC-3 | — | — | — | 70.05 | 70.05 | — | — | — | 70.05 | 70.05 |

TABLE I-continued

|  | C1 | C2 | C3 | C4 | C5 | 1 | 2 | 3 | 4 | 5 |
|---|---|---|---|---|---|---|---|---|---|---|
| SAN-1 | 8.8 | — | — | — | — | 8.8 | — | — | — | — |
| SAN-2 | — | 8.8 | — | — | — | — | 8.8 | — | — | — |
| SAN-3 | — | — | 8.8 | 8.3 | 8.3 | — | — | 8.8 | 8.3 | 8.3 |
| ABS HRG | 6.5 | 6.5 | 6.5 | 9 | 9 | 6.5 | 6.5 | 6.5 | 9 | 9 |
| FR | 9.5 | 9.5 | 9.5 | 11.5 | 11.5 | 9.5 | 9.5 | 9.5 | 11.5 | 11.5 |
| WA-IM | 1 | 1 | 1 | — | — | 1 | 1 | 1 | — | — |
| PTFE-MB | 0.5 | 0.5 | 0.5 | 0.4 | 0.4 | 0.5 | 0.5 | 0.5 | 0.4 | 0.4 |
| Stabilizers | 0.16 | 0.08 | 0.08 | 0.25 | 0.25 | 0.08 | 0.08 | 0.08 | 0.25 | 0.25 |
| LUB. | 0.15 | 0.15 | 0.15 | 0.5 | 0.5 | 0.15 | 0.15 | 0.15 | 0.5 | 0.5 |
| $TiO_2$-1 | 1.5 | 1.5 | 1.5 | 2.36 | 4.72 | — | — | — | — | — |
| $TiO_2$-2 | — | — | — | — | — | 1.5 | 1.5 | 1.5 | 2.36 | 4.72 |
| Pigments | 0.0842 | 0.0842 | 0.0842 | 0.1374 | 0.2748 | 0.0842 | 0.0842 | 0.0842 | 0.1374 | 0.2748 |
| Streaking | 3.2 | 2.92 | 1.78 | 3.27 | 3.87 | 1.47 | 0.93 | 0.80 | 1.53 | 3.47 |
| Average dL shift value | 0.54 | 0.38 | 0.33 | — | — | 0.27 | 0.20 | 0.21 | — | — |

While the preceding discussion includes very particular disclosure, various modifications to the disclosure may occur to an artisan of ordinary skill, and all such modifications should be considered to be within the scope of the claims appended hereto.

We claim:

1. A streak resistant, injection moldable thermoplastic resin composition comprising:
   (a) an aromatic polycarbonate resin,
   (b) a rubber modified graft copolymer comprising a discontinuous rubber phase dispersed in a continuous rigid thermoplastic phase, wherein at least a portion of the rigid thermoplastic phase is chemically grafted to the rubber phase,
   (c) a rigid copolymer, and
   (d) a surface modified titanium dioxide having a first coating and being free from additional coatings.

2. The composition of claim 1, wherein said first coating comprises a coating selected from the group consisting of polyol and polysiloxane.

3. The composition of claim 2, wherein said polyol comprises trimethylol propane.

4. The composition of claim 2, wherein said polysiloxane comprises polydimethylsiloxane.

5. The composition of claim 1, further comprising a fluoropolymer.

6. The composition of claim 5, further comprising a flame retarding amount of an organophosphorus flame retardant.

7. The composition of claim 6, wherein the composition comprises, based on 100 parts by weight of the thermoplastic resin composition, from about 50 to 90 parts by weight of the aromatic polycarbonate resin, from about 4 to 30 parts by weight of rubber modified graft copolymer, from about 2 to 15 parts by weight of rigid copolymer, from about 0.2 to 1.0 parts by weight of fluoropolymer, from 5 to 15 parts by weight of organophosphate flame retardant, and from 0.3 to 10 parts by weight of the titanium dioxide.

8. The composition of claim 7, wherein the composition comprises, based on 100 parts by weight of the thermoplastic resin composition, from about 70 to 81 parts by weight of the aromatic polycarbonate resin, from about 5 to 10 parts by weight of the rubber modified graft copolymer, from about 5 to 10 parts by weight of the rigid copolymer, from about 0.4 to 0.8 parts by weight of the fluoropolymer, from about 8 to 12 parts by weight of the organophosphorus flame retardant, and from about 0.8 to 2.5 parts by weight of the titanium dioxide.

9. The composition of claim 1, further comprising a weatherable acrylic impact modifier.

10. The composition of claim 9, wherein said weatherable acrylic impact modifier comprises less than about 5 parts by weight of the total weight of the thermoplastic resin composition.

11. The composition of claim 10, wherein said weatherable acrylic impact modifier comprises from about 1.0 to 5.0 parts by weight of the total weight of the thermoplastic resin composition.

12. The composition of claim 1, wherein the rubber phase of the rubber modified graft copolymer comprises a dimer based surfactant.

13. The composition of claim 1, wherein the polycarbonate resin is derived from bisphenol A and phosgene.

14. The composition of claim 1, wherein the rubber phase comprises a polybutadiene polymer or a poly(styrene-butadiene) copolymer and the rigid thermoplastic phase comprises structural units derived from one or more monomers selected from vinyl aromatic monomers and a monoethylenically unsaturated nitrile monomers.

15. The composition of claim 14, wherein rigid phase comprises a copolymer derived from monomers selected from the group consisting of styrene, alpha-methyl styrene and acrylonitrile.

16. The composition of claim 8, wherein the rigid copolymer comprises styrene and acrylonitrile monomers with the compositional ratio being about 60 to 90 weight percent to 10 to 40 weight percent.

17. The composition of claim 8, wherein the rigid copolymer comprises at least about 85 weight percent methylmethacrylate and the remaining comonomers are ethyl acrylate, acrylonitrile, styrene, methylmethacrylate or mixtures thereof.

18. The composition of claim 6, wherein the organophosphorus flame retardant comprises one or more compounds according to the structural formula:

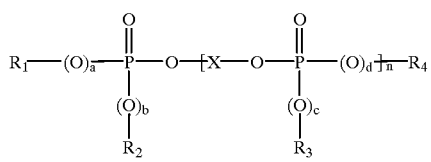

wherein: $R_1$, $R_2$, $R_3$ and $R_4$ are each independently aryl, which may be optionally substituted with halo or alkyl, X is arylene, optionally substituted with halo or alkyl, a, b, c and d are each independently 0 or 1, and n is an integer from 0 to 5.

19. The composition of claim 5, wherein the fluoropolymer is provided in an amount effective to provide anti-drip properties to the composition.

20. The composition of claim 19, wherein the fluoropolymer is a tetrafluoroethylene polymer.

21. The composition of claim 19, wherein the fluoropolymer is added to the composition in the form of an additive made by emulsion polymerization of one or more monoethylenically unsaturated monomers in the presence of an aqueous dispersion of the fluoropolymer.

22. The composition of claim 21, wherein the additive is made by emulsion polymerization of styrene and acrylonitrile in the presence of an aqueous dispersion of polytetrafluoroethylene particles.

23. An article made by molding the composition of claim 1.

24. The article of claim 23, wherein said molding is injection molding.

25. A method of injection molding comprising using a titanium dioxide containing polycarbonate resin composition wherein said titanium dioxide is coated with a single coating, said method resulting in molded articles having essentially no streaking.

* * * * *